United States Patent Office 3,381,667
Patented May 7, 1968

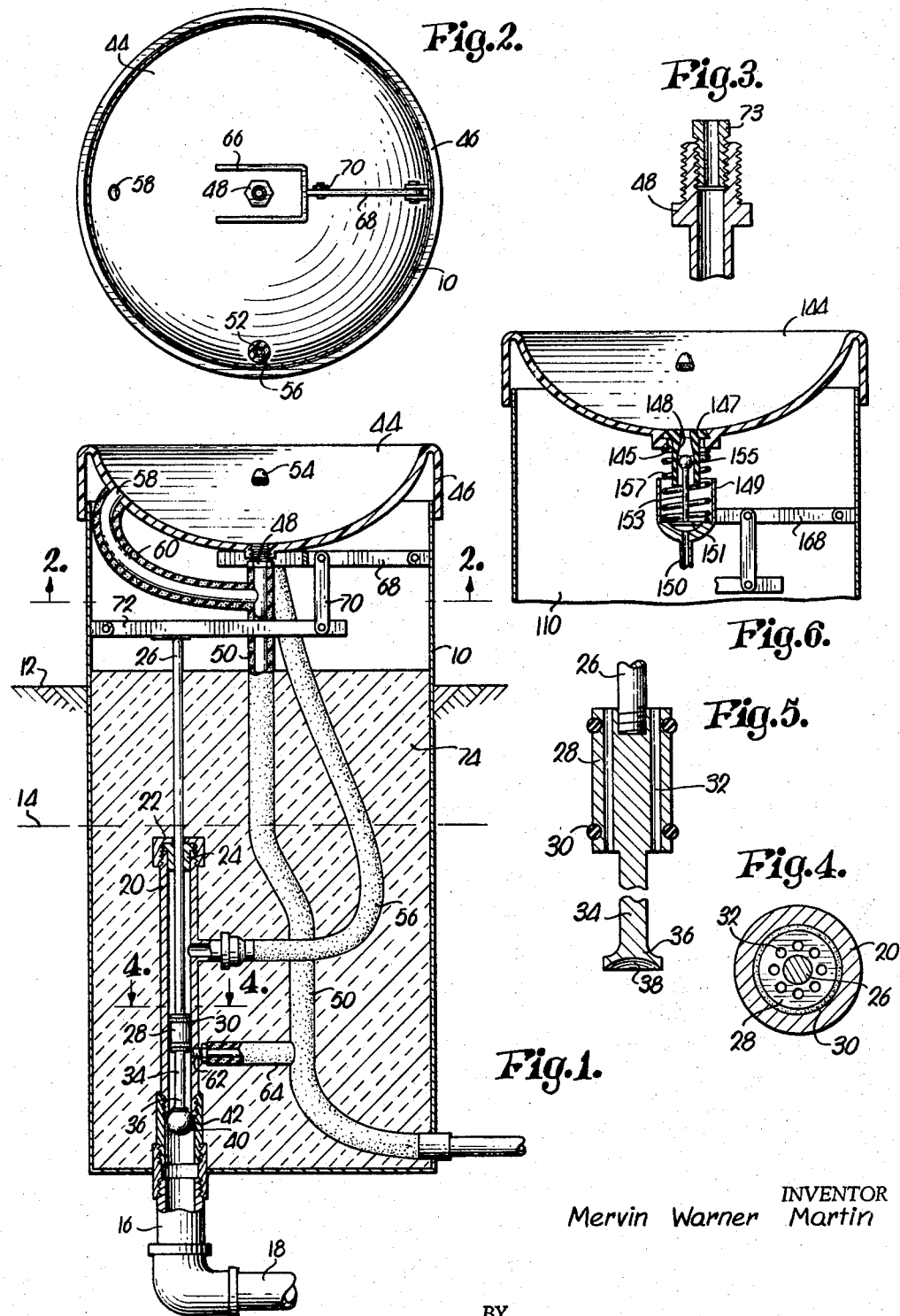

3,381,667
ANIMAL WATERING INSTALLATION
Mervin Warner Martin, 8028 Washington,
Kansas City, Mo. 66112
Filed July 18, 1966, Ser. No. 566,069
11 Claims. (Cl. 119—75)

This invention relates to a stock watering installation and, more particularly, to a watering device adapted for outside use in freezing weather.

In cold weather climates, watering installations for farm stock must include safeguards to prevent freezing of water delivered to an outside drinking trough. External heating apparatus may be used, but this is an expensive method and is not particularly suited for prolonged, heavy-duty use, especially when exposed to the elements. Other attempts have centered around automatic delivery means which directs water into a trough or the like when the animal steps onto a platform or shifts the trough with his head. When the animal moves away from the trough, the delivery of water is discontinued and excess water is drained therefrom so that it will not freeze in the trough. However, the inlet and outlet conduits and the drains of such an installation often become coated with ice which eventually accumulates and clogs the system.

Accordingly, it is the primary object of this invention to provide an animal-actuated watering installation having drain means as above described, wherein novel structure is utilized to assure that water delivered to and drained from the drinking point is continuously moving and is adequately insulated from the cold weather to minimize the possibility of ice formation. Additionally, all water not being delivered or drained is maintained at a location below the freezer line of the locale where the installation is being used.

It is another object of the instant invention to provide a watering installation of the aforementioned character wherein additional drainage safeguards are utilized to give multiple protection in the event the primary drain becomes clogged in extremely cold weather. More particularly, auxiliary drain means is included to guard against overflowing of the trough, and also, ice-breaking means is positioned on the installation to crack accumulated ice.

In the drawing:

FIG. 1 is a fragmentary, vertical cross-sectional view of a watering installation made pursuant to the present invention, parts thereof being shown in elevation for clarity;

FIG. 2 is a cross-sectional view taken along line 2—2 of FIG. 1, parts being removed for clearness;

FIG. 3 is an enlarged, fragmentary, vertical cross-sectional view of the primary drain for the installation, showing the same with a plug attachment;

FIG. 4 is an enlarged, cross-sectional view taken along line 4—4 of FIG. 1 and showing a piston element for use with the installation;

FIG. 5 is a fragmentary, substantially central, vertical cross-sectional view of the piston element shown in FIG. 4; and FIG. 6 is a fragmentary, cross-sectional view similar to FIG. 1, showing an alternate embodiment of the invention utilizing ice-breaking means.

The animal watering assembly of the present invention includes an open top, cylindrical support casing 10, partially buried in the ground so that its upper portion extends above the surface 12 of the ground, the latter having a freeze line 14 at a distance below surface 12. The freeze line 14 is that point below which water will not normally freeze and is determined by the climate of the locale in which the watering installation is being used. It is anticipated that the installation will primarily be used for livestock and thus will be located, for example, in cattle feeding pens or the like, although it will be recognized that the installation is suitable for any type of animal.

A pipe 16 extends through the bottom of casing 10 and is coupled to a supply pipe 18 which delivers water to the installation from a remote pressurized water supply. The uppermost end of pipe 16 is threadably secured to a delivery pipe 20 extending vertically within casing 10 and having a cap 22 at its uppermost end. Cap 22 retains a seal 24 which has a bore therein aligned with an opening in cap 22 for slidably receiving a rod 26 which is longitudinally shiftable in delivery pipe 20.

A cylindrical piston element 28 is in threaded interengagement with the lowermost end of rod 26 and has a pair of circumscribing grooves on its outermost surface to receive O-rings 30. A plurality of longitudinal bores 32 extend through piston element 28 and are circumscribed about rod 26 (FIGS. 4 and 5). Piston element 28 has an integral plunger 34 extending downwardly therefrom and terminating in a head 36 which has a lower concave surface 38.

Valve means for the installation includes a ball 40 within pipe 16 and having a diameter greater than delivery pipe 20 whereby the lowermost end of delivery pipe 20 presents a seat 42 into which ball 40 is normally forced by the pressurized water supply. Concave surface 38 of plunger 34 is configured to complementally receive ball 40 when it engages the latter.

The trough of the installation comprises a bowl-shaped receptacle 44 having an integral, annular, dependent flange 46 along its periphery for slidably engaging the proximal outer surface at the top of casing 10 for relative vertical shifting movement. A primary central drain is provided at the lowermost portion of receptacle 44 and is coupled to an outlet conduit in the form of an insulated hose 50. Insulated hose 50 extends below freeze line 14 and through casing 10 for the delivery of water to a sump or other drainage area.

An inlet port 52 is formed in receptacle 44 above drain 48 and has a spout 54 extending therethrough, the spout being connected to an insulated inlet hose 56 which extends downwardly for connection to delivery pipe 20 at a location above piston 28. An outlet port 58 in receptacle 44 is vertically spaced between inlet port 52 and drain 48 and is connected to an auxiliary outlet conduit 60 which intersects with outlet hose 50 below drain 48. A drain port 62 in delivery pipe 20 communicates with outlet hose 50 through a tube 64 which is disposed below freeze line 14.

Receptacle 44 is carried by the bifurcated end 66 of a lever 68 which is pivotally secured to the inner surface of casing 10. A vertical link 70 is pivotally secured at its opposed ends to lever 68 and a bar 72, the latter being pivotally secured to the inner surface of casing 10 and extending above rod 26.

In operation, the pressurized water supply delivered through pipe 18 forces ball 40 against seat 42 to prevent passage of water through delivery pipe 20. Ball 40 supports rod 26 in an upper position so that the uppermost end of the rod engages bar 72 to support receptacle 44 in an upper, draining position. An animal desiring to obtain a drink from the watering installation must apply pressure with his head to depress receptable 44 to a filling position which swings lever 68 and bar 72 downwardly, the latter forcing rod 26 to a lower position to unseat ball 40 and thereby open the valve means to permit the flow of water from supply pipe 18 to delivery pipe 20. When rod 26 is shifted into its lower position, piston 28 is shifted into alignment with drain port 62 so that water being delivered into pipe 20 will flow through longitudinal bores 32, but will be precluded from draining through port 62 by O-rings 30. After the water flows through bores 32 it continues upwardly through inlet hose 56 to emanate into receptacle 44 through spout 54.

As water is delivered through spout 54, it is simultaneously emptied through drain 48 to present a continual movement of water in the entire conduit system which protects against freezing of the water within the conduits and receptacle. The speed at which the water must be drained to prevent freezing within the receptacle will be determined, of course, by the ambient temperature. If the temperature is sufficiently high, it would be desirable to insert a plug 73 in drain 48 as shown in FIG. 3, to slow the drainage and permit the water to rise to a higher level in receptacle 44 to facilitate drinking therefrom. However, if the temperature is too low, plug 73 should be removed to permit faster drainage and thereby reduce the danger of freezing. In any event, drain 48 is preferably dimensioned so that drainage will be at a slower rate than filling, to assure that the receptacle will not become completely empty while the animal is drinking.

Should ice accumulate during extremely cold weather and clog drain 48, the water flowing from spout 54 will not overflow receptacle 44 for the reason that the rising water will drain through outlet port 58 and subsequently through conduit 60 and hose 50. The various conduits are heavily insulated to further protect against ice formation and, if desired, casing 10 may be partially filled with an insulating material 74.

When the animal has finished drinking and raises his head to release the pressure on receptacle 44, the latter will be elevated to its draining position by the action of the pressurized water supply which reseats ball 40. The water remaining in receptacle 44 will flow through drain 48 and outlet hose 50 for delivery to a drainage area, such as a sediment tank and sump arrangement, with the water being delivered below freeze line 14. The water remaining in the inlet conduit presented by hose 56 and pipe 20 will flow downwardly through the longitudinal bores 32 in piston 28 (which has shifted upwardly with rod 26) and thence through tube 64 into outlet hose 50. A small volume of water will remain in delivery pipe 20 above ball 40 and below drain port 62, but this water is below freeze line 14 and thus will not be in danger of freezing.

An additional safeguard against ice formation is provided in the embodiment of the invention illustrated in FIG. 6, wherein the casing 110 slidably supports a receptacle 144, the latter having an opening 145 at its lowermost portion. A drain in the form of a flexible, tubular hose member 147 having a restricted neck portion 148, is secured within opening 145 by complemental dovetail construction and extends within a cup 149 which is supported by end 166 of lever 168 in communication with an outlet hose 150. A bar 151 extends across cup 149 and supports a standard 153 having a ball abutment 155 at its uppermost end extending within hose member 147. Ball abutment 155 has a diameter substantially equal to the inner diameter of neck portion 148. A coil spring 157 is housed in cup 149 and circumscribes hose member 147 to resiliently bias receptacle 144 upwardly.

The water delivery and drainage means for receptacle 144, and the linkage supporting the latter, are substantially identical to that of receptacle 44 so that, when receptacle 144 is depressed by an animal, hose member 147 will shift downwardly against the action of spring 157 and become journalled over abutment 155 in tight engagement with the inner surface of neck 148 to cause a flexing of the hose member. In the event that ice has formed along the lower inner surface of receptacle 144 and clogged hose member 147, the flexing of the latter will crack the ice on the surface of the hose member, and the cracks in the ice on the hose member will spread outwardly to break up the ice on receptacle 144. Further downward shifting of receptacle 144 to its filling position is transferred through standard 153 and cup 157 to pivot lever 168 to open the valve and cause water to flow into the receptacle, the water being drained through outlet hose 150 when the receptacle returns to its draining position which removes hose member 147 from ball abutment 155. Abutment 155, therefore, provides continual ice-breaking means for hose member 147 to assure passage of water therethrough for draining receptacle 144.

Having thus described the invention, what is claimed as new and desired to be secured by Letters Patent is:

1. An animal watering installation adapted for outside use above the surface of the ground, the latter having a freeze line at a distance below the surface, said installation comprising:
   a support extending above the surface of the ground;
   a receptacle;
   means mounting said receptable on the support for shifting between a non-filling draining position and a filling position;
   an inlet port in the receptacle;
   an insulated inlet conduit communicating with said inlet port and extending below the freeze line for coupling to a pressurized water supply;
   a drain in the receptacle;
   an insulated outlet conduit coupled to said drain and extending below the freeze line;
   a pipe connected to said inlet conduit below the freezing line and extending below the latter;
   valve means for said inlet conduit within the pipe below said pipe and inlet conduit connection and having operating positions for opening and closing said inlet conduit to the passage of water through said pipe; and
   pressure-responsive mechanism intercoupling said valve and said means mounting said receptacle to normally yieldably dispose the receptacle in said non-filling draining position when said valve is in said closed position and operable to open said valve when said receptacle is shifted to said filling position in response to a predetermined pressure exerted thereon, whereby water will flow from the pipe to said receptacle until the pressure is removed from the receptacle whereupon said valve closes and excess water in the inlet conduit and receptacle gravitates below the freezing line through said pipe and outlet conduit, respectively.

2. The invention of claim 1, wherein said outlet conduit includes a tube connected with said pipe at a point below the inlet conduit connection and an element coupled to said mechanism for shifting to block passage through said tube when said valve is opened by the mechanism.

3. The invention of claim 2, said mechanism including a rod in said pipe mounted for vertical shifting corresponding to said draining and filling positions, said rod being coupled to said element and valve means to operate the same.

4. The invention of claim 3, said element comprising a piston on the rod shiftable to block said tube at its connection to the pipe, the piston having longitudinal bores therein to permit passage of water through the pipe to said inlet conduit.

5. The invention of claim 3, said valve means including a ball carried in a seat provided in said pipe, the valve normally being held in said seat by the force of the pressurized water supply, the rod operating to unseat the ball when shifted to open the valve.

6. The invention of claim 1, said inlet port being spaced above said drain, there being an outlet port vertically spaced between said inlet port and drain, and an auxiliary outlet conduit communicating with said outlet port and leading therefrom for draining below the freeze line.

7. The invention of claim 1, and ice-breaking means connected to said support, said breaking means being positioned to crack ice forming in said drain when said receptacle is shifted to its filling position.

8. The invention of claim 1, said drain including a flexible member, there being an abutment carried by the support in a position to engage said member and flex the same when said receptacle is shifted to its filling position.

9. The invention of claim 1, said drain comprising a tubular, flexible member, said mechanism including linkage coupled to the valve for opening the latter upon shifting of the linkage, the linkage carrying an abutment in alignment with the member, there being a spring interposed between the linkage and receptacle to yieldably bias the latter in its draining position and permitting shifting of the receptacle prior to shifting of said linkage so that said abutment will engage the member to flex the same.

10. The invention of claim 9, said linkage including a cup housing the proximal end of said spring and supporting said abutment, the latter comprising a ball having a diameter substantially equal to the inner diameter of the member.

11. The invention of claim 1, said support comprising a casing partially buried in the ground and carrying said conduits, pipe, tube, valve means and mechanism therein, there being insulation material within the casing to impede freezing of water flowing through the conduits, pipe and tube.

References Cited
UNITED STATES PATENTS

| | | | |
|---|---|---|---|
| 1,228,224 | 5/1917 | Luke et al. | 119—75 |
| 1,328,207 | 1/1920 | Schmidt | 119—75 |
| 3,195,511 | 7/1965 | Leary | 119—75 |

HUGH R. CHAMBLEE, *Primary Examiner.*